(12) United States Patent
Torii et al.

(10) Patent No.: US 6,452,296 B1
(45) Date of Patent: Sep. 17, 2002

(54) MOTOR DEVICE AND TRANSMISSION MECHANISM

(75) Inventors: Katsuhiko Torii, Hamamatsu; Hiroaki Yamamoto, Kosai; Manabu Kato, Hamamatsu, all of (JP)

(73) Assignee: Asmo Co., Ltd., Shizuoka (JP)

( * ) Notice: Subject to any disclaimer, the term of this patent is extended or adjusted under 35 U.S.C. 154(b) by 6 days.

(21) Appl. No.: 09/819,659

(22) Filed: Mar. 29, 2001

(30) Foreign Application Priority Data

Mar. 30, 2000 (JP) ........................................ 2000-093766

(51) Int. Cl.[7] .............................................. H02K 7/116
(52) U.S. Cl. ...................................... 310/75 R; 310/99
(58) Field of Search ................................ 310/75 R, 90, 310/78, 89, 98, 91, 99, 51; 464/68, 64, 63, 66, 67, 73–75, 84, 92; 192/3.28, 70.17, 212, 213.1

(56) References Cited

U.S. PATENT DOCUMENTS 4,227,104 A * 10/1980 Hamman ................... 310/75 R
5,015,897 A * 5/1991 Inagaki et al. ............... 310/89
5,325,736 A * 7/1994 Tsujita .......................... 74/425
5,747,903 A * 5/1998 Klingler .................... 310/75 R
6,242,824 B1 * 6/2001 Torii et al. ................ 310/75 R

FOREIGN PATENT DOCUMENTS

| JP | U-2-31922 | 2/1990 |
| JP | Y2-6-32763 | 8/1994 |
| JP | A-8-197177 | 8/1996 |

* cited by examiner

Primary Examiner—Tran Nguyen
(74) Attorney, Agent, or Firm—Law Offices of David G. Posz

(57) ABSTRACT

In a transmission mechanism having a disk shaped output plate having a flat surface and an output shaft, the output plate is provided in a center thereof with a linking portion formed by drawing to axially extend from the flat surface. The linking portion has a shaft receiving hole with a plurality of engaging surfaces extending axially for receiving circumferential rotational driving force. The output shaft is provided at an axial end thereof with a shaft inserting portion fitted to the shaft receiving hole so that the output shaft is connected to the output plate so as to rotate together therewith in a state that an axial length of the shaft inserting portion in contact with each of the engaging surfaces is longer than the thickness of the flat surface.

13 Claims, 5 Drawing Sheets

MOTOR DEVICE AND TRANSMISSION MECHANISM

CROSS REFERENCE TO RELATED APPLICATION

This application is based upon and claims the benefit of priority of Japanese Patent Application No. 2000-93766 filed on Mar. 30, 2000, the content of which is incorporated herein by reference.

BACKGROUND OF THE INVENTION

1. Field of the Invention

The present invention relates to a motor device applicable to a system such as a vehicle power window apparatus in which a transmission mechanism is employed for transmitting rotational driving force.

2. Description of Related Art

Conventionally, as shown in FIG. 6, in a motor device of a vehicle power window apparatus for opening and closing a side window glass of a vehicle door, rotational driving force of a motor 50 is transmitted through a motor output shaft with a worm (not shown) to a worm wheel 51. The driving force transmitted to the worm wheel 51 is further transmitted via a rubber damper 52 to an output plate 53 and an output shaft 54.

The worm wheel 51, the output plate 53 and the output shaft 54 are arranged to rotate in a same center axis. As shown in FIG. 7, the worm wheel 51 is housed in a wheel accommodating recess 55a of a gear housing 55 and is rotatably held by a bearing portion 56 protruding out of a bottom of the recess 55a. The rubber damper 52 is housed in a damper accommodating ring shaped recess 51a opened upward in the worm wheel 51. The output shaft 54 is rotatably held in a shaft receiving hole 56a provided in the bearing portion 56 and supports the output plate 53 arranged at an opening axial end of the damper accommodating recess 51a. Each of engaging portions 51b of the worm wheel 51 is engaged via each of damper portions 52a of the rubber damper 52 with each of engaging projections 53a of the output plate 53 so that the rotational driving force is transmitted from the worm wheel 51 to the output plate 53.

The output plate 53 is formed by press stamping a metal sheet. The output plate 53 is provided in a center thereof with a shaft receiving hole 53b formed by stamping. As shown in FIG. 8, a shaft inserting portion 54a of the output shaft 54 is fitted to the shaft receiving hole 53a. The engaging projections 53a are formed by bending downward outer circumferential parts of the output plate 53 so as to form notches or holes adjacent thereto.

When the motor 50 rotates to drive the side window glass upwardly and, then, the side window glass comes in contact with a window frame so that the upward movement of the side window glass is suddenly restricted, a rotation of the output plate 53 is restricted. The restriction of the output plate 53 causes a restriction of rotation of the worm wheel via the rubber damper 52. The rubber damper 52 absorbs reaction force suddenly acting against the worm wheel 51 or the motor 50 so that a shock to the motor 50 is eased.

The conventional motor device has a drawback that fitting of the output plate 53 to the output shaft 54 is likely to loose as a clearance therebetween is formed circumferentially during an actual use. The rotational driving reaction force causes to deform the shaft receiving hole 53b of the output plate 53 so that that the clearance is circumferentially formed. That is, a construction of the shaft receiving hole 53b of the output shaft 53 does not have sufficient strength to endure large force applied from the shaft inserting portion 54a of the output shaft 54 to the shaft receiving hole 53b at a time during which the shock is absorbed.

To cope with this problem, it may be contemplated to employ the output plate 53 whose material sheet thickness is thicker or whose material strength is stronger so that the shaft receiving hole 53b is unlikely to deform. However, press stamping a metal sheet having thicker thickness or stronger strength is more difficult, resulting in shortening a lifetime of pressing equipment and reducing dimensional accuracy of the output plate or increasing material cost.

SUMMARY OF THE INVENTION

An object of the invention is to provide a transmission mechanism having an output plate and an output shaft for transmitting rotational driving force from the output plate to the output shaft in which fitting of the output shaft to the output plate is unlikely to loose during an actual use.

It is another object of the invention to provide a motor device having the transmission mechanism thereof.

To achieve the above object, a transmission mechanism for transmitting rotational driving force has a driven member rotating upon receiving the rotational driving force, an output plate having a flat surface and engaged with the driven member to rotate together therewith, and an output shaft.

The output plate is integrally provided in a center thereof with a linking portion axially extending by a length longer than thickness of the flat surface. The linking portion has a shaft receiving hole with a plurality of engaging surfaces extending axially for receiving circumferentially the rotational driving force. The output shaft is provided at an axial end thereof with a shaft inserting portion fitted to the shaft receiving hole so that the output shaft penetrates the driven member and is connected to the output plate so as to rotate together therewith in a state that an axial length of the shaft inserting portion in contact with each of the engaging surfaces is longer than the thickness of the flat surface.

In a case of a motor device having the transmission mechanism, the motor device is composed of a motor, a gear housing fixed to the motor and provided in a center thereof with a bearing, a wheel housed in the gear housing and driven to rotate around the bearing by the motor, a damper housed in the recess to rotate together with the wheel, an output plate having a flat surface and engaged with the damper to rotate via the damper together with the wheel, and an output shaft rotatably held in the bearing.

The wheel is provided on a surface thereof perpendicular to a center axis of the bearing with a recess. The output plate is integrally provided in a center thereof with a linking portion axially extending by a length longer than thickness of the flat surface. The linking portion has a shaft receiving hole with a plurality of engaging surfaces extending axially for receiving circumferential force. The output shaft is provided at an axial end thereof with a shaft inserting portion fitted to the shaft receiving hole so that the output shaft penetrates the wheel and the damper and is connected to the output plate so as to rotate together therewith in a state that an axial length of the shaft inserting portion in contact with each of the engaging surfaces is longer than the thickness of the flat surface. With the motor device mentioned above, the wheel and the damper correspond to the driven mechanism of the transmission mechanism.

According to the transmission mechanism or the motor device mentioned above, reaction force from the output shaft is applied to axially extending wide areas of the engagement surfaces so that stresses are not concentrated to a limited area thereof. Accordingly, the linking portion scarcely deforms so that the fitting of the output shaft to the output plate is unlikely to loose during an actual use, even if the output plate is formed by press stamping a metal sheet whose sheet thickness and material strength are similar to the conventional metal sheet.

It is preferable that the linking portion is formed in shape of a composite pipe having inside and outside walls which are folded down each other. The outside wall extends to protrude out of the flat surface toward the driven member and the inside wall, which is formed in cylindrical shape, extends perpendicularly to the flat surface in a direction opposite to the driven member through an inside of the outside wall.

Preferably, the inside wall extends up to a position exceeding a surface of the flat surface on an opposite side to the driven member so that both axial ends of the inner wall are positioned on opposite sides of the flat surface.

Accordingly, structural strength of the linking portion is sufficiently reinforced, axial length of the transmission mechanism is effectively limited.

Further, it is preferable that the output plate is integrally provided at outer periphery of the flat surface with engaging projections protruding on a side of the damper with grooves extending radially at given angular intervals on the flat surface on an opposite side to the damper, the engaging projections being circumferentially engaged with the damper. Since notches or holes, which are opened downward and adjacent to the engaging projections, are not formed, the damper never warp toward the output plate so as to partly enter into the notches or holes, when the rotational driving reaction force is applied circumferentially from the engaging projections to the damper portions, as shown in the conventional output plate. Therefore, the damper is elastically deformed only in a circumferential direction with respect to the center axis thereof so that the damper may absorb more surely the reaction force that is remarkably large.

Furthermore, preferably, the bearing is provided at an axial end thereof with a recess in which the linking portion is partly accommodated. The wheel and the output plate are partly overlapped in an axial direction. Accordingly, while an axial length of the output shaft or the transmission mechanism becomes shorter or compact, the axial length of the bearing for supporting the wheel becomes longer so that more stable rotation of the wheel may be secured.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

A motor device applied to a vehicle power window apparatus according to an embodiment of the present invention is described with reference to FIGS. 1 to 5.

Figure 1:
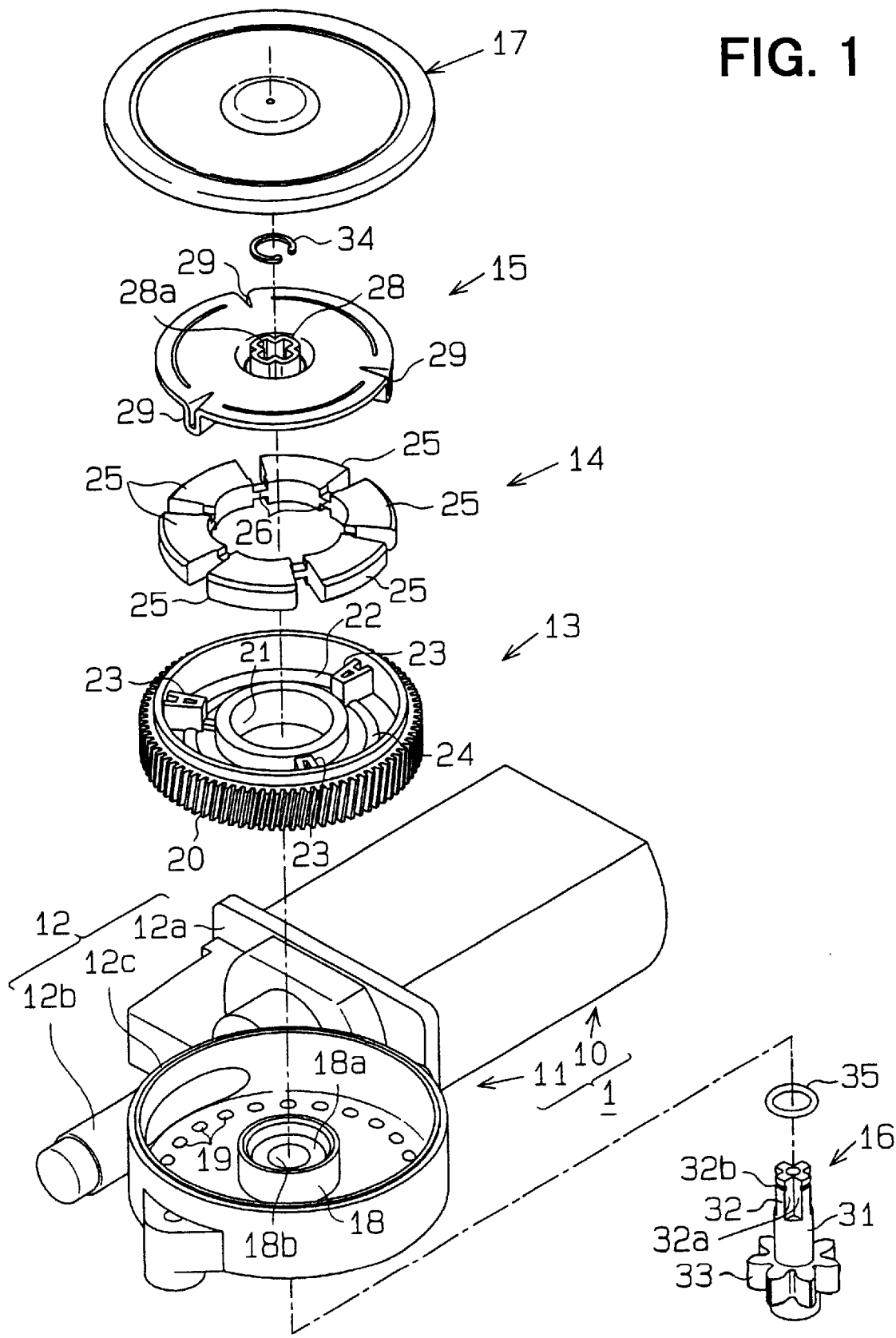
FIG. 1 is a exploded perspective view of a motor device according to an embodiment of the present invention.

As shown in FIG. 1, a motor device 1 is composed of a motor 10 and a speed reduction mechanism 11. A motor output shaft (not shown) extends from the motor 10 to the speed reduction mechanism 11. The speed reduction mechanism 11 is composed of a gear housing 12, worm wheel 13 for transmitting driving force, a rubber damper 14, a driving force output plate 15, a driving force output shaft 16 and a cover 17.

The gear housing 12, which is made of plastics and formed integrally into one body, is provided with a motor fixing portion 12a, a worm accommodating portion 12b and a wheel accommodating portion 12c. The motor 10 is fixed to the motor fixing portion 12a and the motor output shaft extends into an inside of the worm accommodating portion 12b. The motor output shaft is provided with a worm gear (not shown) that is partly positioned inside the wheel accommodating portion 12c.

The wheel accommodating portion 12c is formed in shape of a cylinder having a bottom and is provided in a center with a cylindrical bearing portion 18 protruding upward out of the bottom thereof. The bearing portion 18 is provided with a recess 18a positioned at an upper end surface thereof and a shaft hole 18b extending axially along a center axis thereof. The wheel accommodating portion 12c is further provided on an upper surface of the bottom thereof with a plurality of supporting projections 19 formed circumferentially at constant angular intervals about a center axis thereof. The supporting projections 19 serve to support rotatably the worm wheel 13 housed inside the wheel accommodating portion 12c.

The worm wheel 13, which is made of plastics and formed in shape of a cylinder having a bottom, is provided at an outer circumference thereof with gears 20 which are in mesh with the worm gear. The worm wheel 13 is provided in a center thereof with a shaft hole 21 penetrating in a direction of a center axis thereof, and between the gears 20 and the shaft hole 21 with a ring shaped damper accommodating recess 22 which is opened upward and in which the rubber damper 14 is housed.

Figure 2:
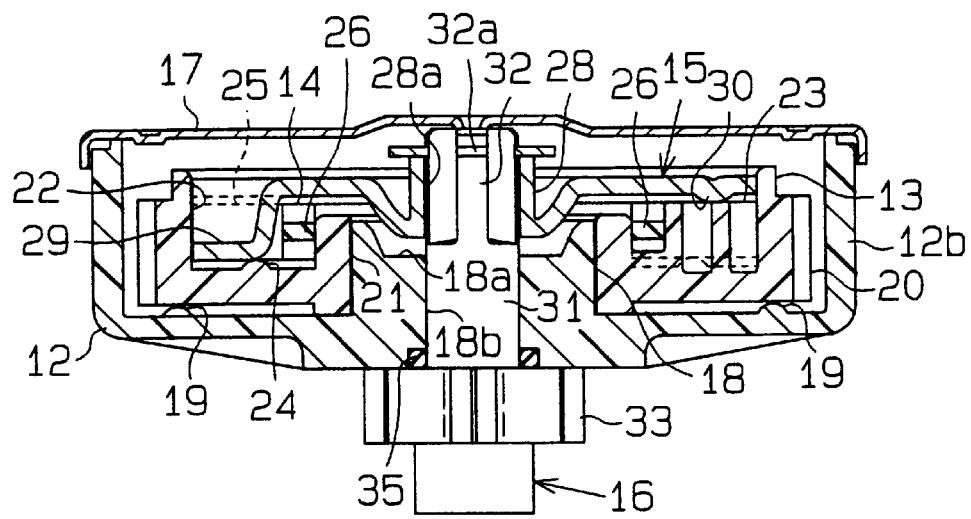
FIG. 2 is a schematic cross sectional view showing a transmission mechanism of the motor device of FIG. 1.

The damper accommodating recess 22 is provided on an upper surface of the bottom thereof with three engagement portions 23 which are arranged at constant angular intervals and extend radially with respect to the center axis of the shaft hole 21. The engagement portions 23 are three partitions by which the damper accommodating recess 22 is circumferentially divided into three roughly fan shaped spaces around the shaft hole 21. The damper accommodating recess 22 is further provided on an upper surface of the bottom thereof with projecting portions 24 extending circumferentially along a circle whose center is the center axis thereof. As shown in FIG. 2, the worm wheel 13 is housed in the wheel accommodating portion 12c so as to rotate about each center of the bearing portion 18 and the shaft hole 21 in a state that the bearing portion 18 is inserted into the shaft hole 21 and a lower surface of the bottom thereof is in contact with the projections 19. An upper periphery surface of the worm wheel 13 is placed at a position higher than that of an upper periphery surface of the bearing portion 18. The rubber damper 14 is housed in the damper accommodating recess 22.

As shown in FIG. 1, the rubber damper 14, which is formed in ring shape and integrally into one body, is provided with six damper portions 25 each of which is formed in fan shape. The damper portions 25 are arranged in a ring shape with a gap therebetween and are connected to each other with connecting portions 26 bridging the gap on an inner circumferential side thereof. The rubber damper 14 is housed in the damper accommodating recess 22 in a state that two of the damper portions 26 adjacent each other are housed in each of the fan shaped spaces divided by the engagement portions 23. Each of the engagement portions 23 is positioned and fitted between two of the damper portions 25 which are respectively housed in the fan shaped spaces adjacent each other. Each lower surface of the damper portions 25 at a radially middle position thereof is in contact with and supported by the projection 24. The output plate 15 is positioned on an upper side of the rubber damper 14.

Figure 3A:
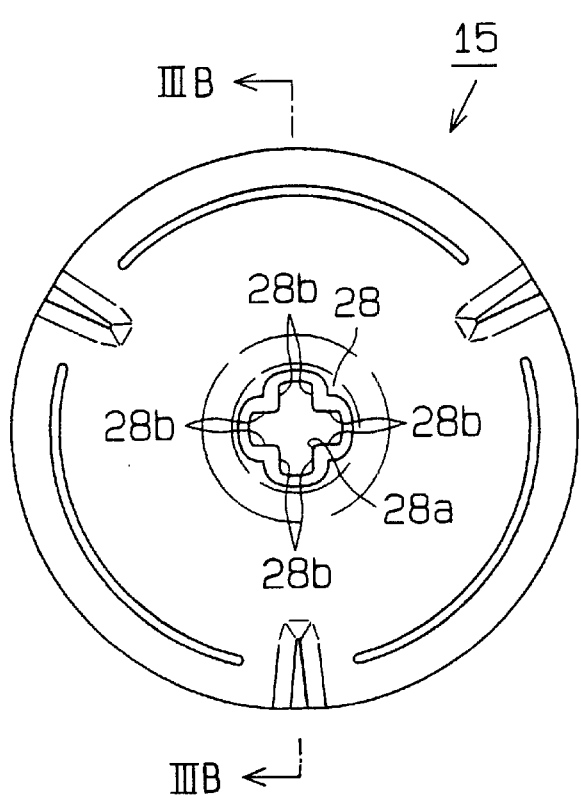
FIG. 3A is a plan view of an output plate of the motor device of FIG. 1.
Figure 3B:
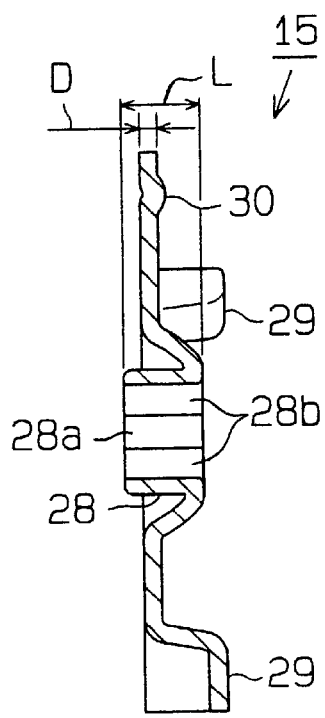
FIG. 3B is a cross sectional view taken along a line IIIB—IIIB of FIG. 3A.

As shown in FIG. 1, the output plate 15 is formed in roughly disk shape by stamping a metal sheet. As shown in FIGS. 3A and 3B, a shaft receiving portion 28 (linking portion), to which the output shaft 16 is fixed, is formed in a center of the output plate 15 by plastically deforming with press drawing and perforating with stamping. The shaft receiving portion 28 is shaped as a composite pipe having an outside wall and an inside wall which are folded down and connected integrally to each other. The outside wall is formed in conical shape and extends downward so as to protrude out of a flat surface of the output plate 15. The inside wall, which is formed in cylindrical shape and perpendicular to the flat surface, extends upward from a folding down end of the outside wall through an inside of the outside wall up to a position higher than that of the flat surface of the output plate 15.

The inside wall is provided inside with a shaft receiving hole 28a, whose cross section is cross-shaped, penetrating in a direction of a center axis thereof. As shown in FIG. 3B, length (L) of the shaft receiving hole 28, that is, axial height of the inside wall, is longer than thickness (D) of the original metal sheet and opposite axial ends of the inside wall are positioned on opposite sides of the flat surface of the output plate 15, respectively. The cross-shaped shaft receiving hole 28a constitutes a plurality of engagement surfaces 28b with which the output shaft 16 is engaged and through which circumferential rotational driving force is transmitted to the output shaft. In the shaft receiving hole 53b of the conventional output plate 53, the rotational driving force is transmitted to the shaft inserting portion 54a of the output shaft 54 through a thickness portion of the plate 53 whose axial length is plate thickness of the output plate 53. According to the embodiment of the present embodiment, however, each axial length of the engagement surfaces is thicker by several times than the thickness of the metal sheet to be press stamped for forming the output plate 15.

To form the shaft receiving portion 28 having the shape mentioned above, at first, a center of the output plate 15 is deformed to extend upwardly by press drawing so that the cylindrical inside wall having a bottom is formed. Then, a portion of the output plate 15, which is positioned around the outer circumference of the inside wall, is deformed to extend downward by press drawing so that the outside wall, which is connected to a folding down end of the inside wall, is formed. Then, the inside wall is further deformed to form the shaft receiving hole 28a and perforate the bottom thereof by press drawing and stamping.

Figure 4:
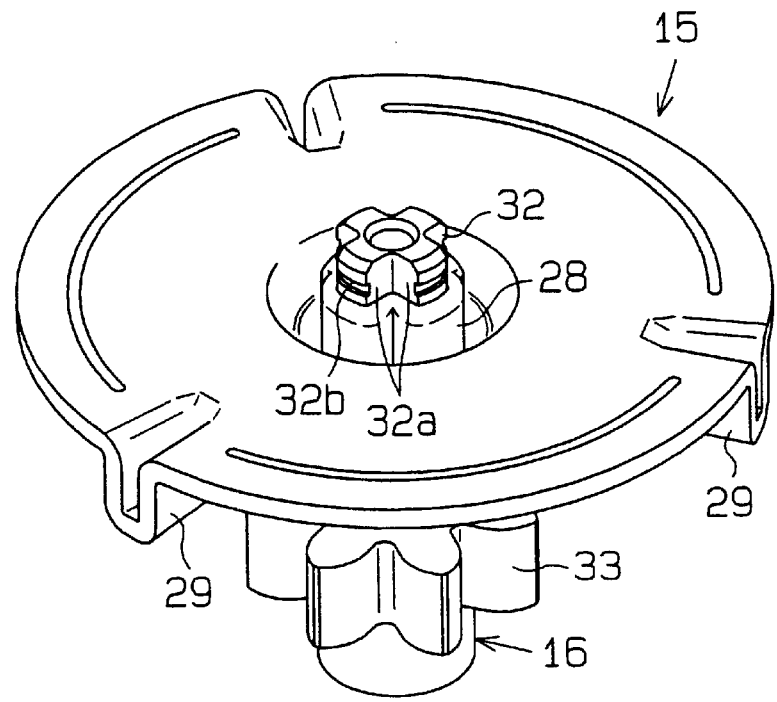
FIG. 4 is an upper side perspective view of the output plate to which an output shaft is fitted.
Figure 5:
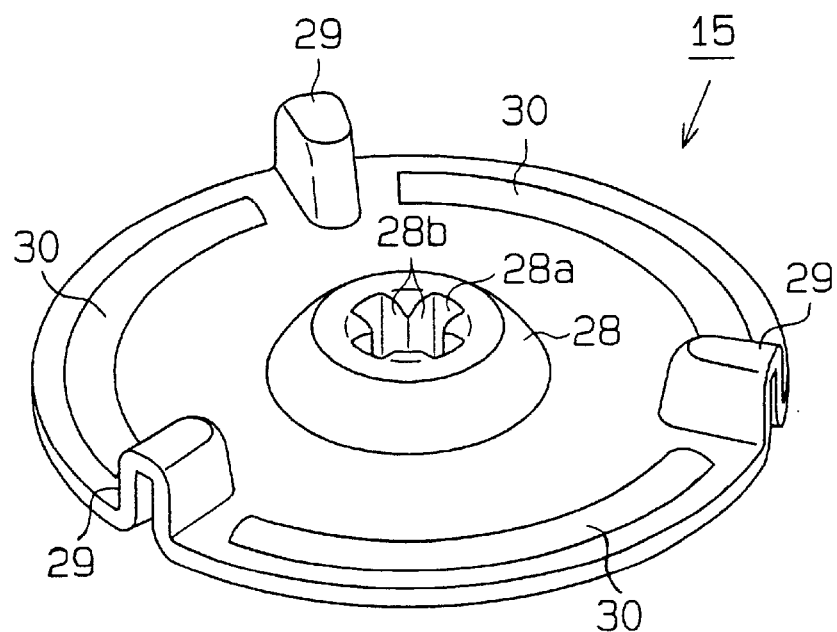
FIG. 5 is a lower side perspective view of the output plate.
Figure 6:
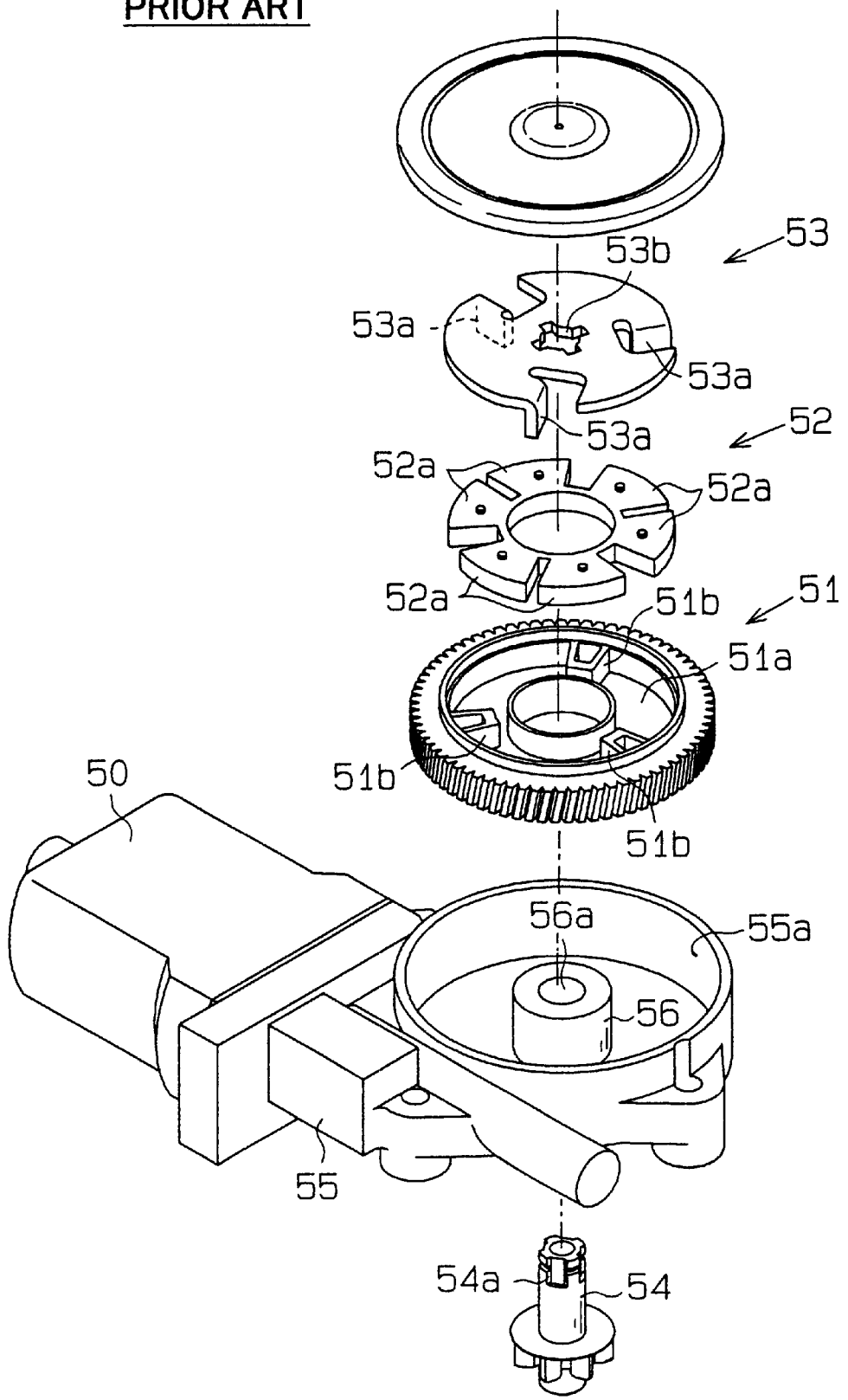
FIG. 6 is an exploded perspective view of a conventional motor device as prior art.
Figure 7:
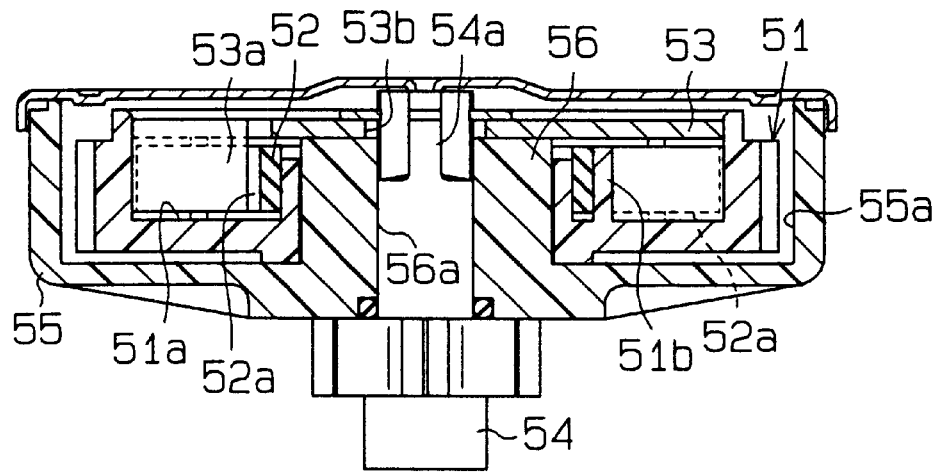
FIG. 7 is a schematic cross sectional view showing a transmission mechanism of the conventional motor device of FIG. 6 as prior art.
Figure 8:
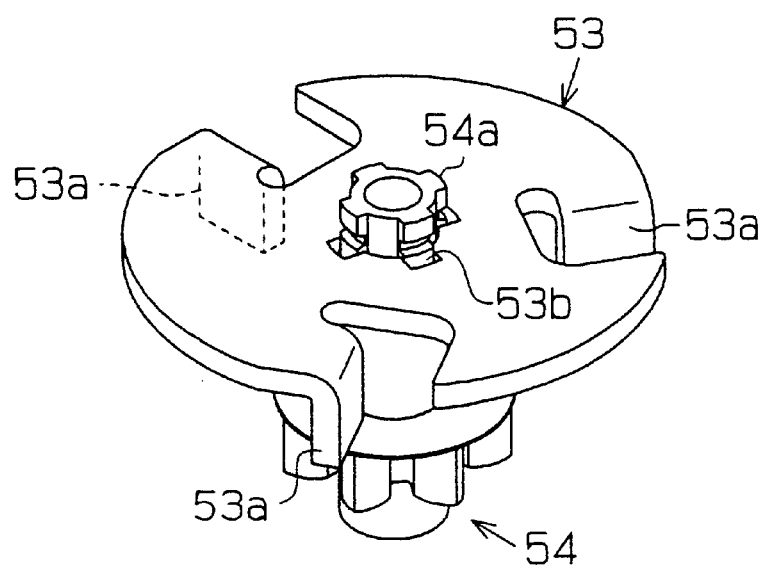
FIG. 8 is an upper side perspective view of the output plate to which an output shaft is fitted as prior art.

As shown in FIGS. 4 and 5, the output plate 15 is provided with three engaging projections 29 formed so as to protrude downward in center axis direction thereof by drawing outer periphery thereof. The engaging projections 29, each of which constitutes a groove extending radially on an upper surface of the output plate 15 and is opened at the most outer circumference of the output plate 15, are arranged at constant angular intervals. The engaging projections 29 are circumferentially engaged with the damper portions 25 of the rubber damper 14. The output plate 15 is provided on a lower surface thereof with arc shaped projections 30 extending circumferentially.

As shown in FIG. 2, the output plate 15 is positioned at an opening end of the damper accommodating recess 22 in a state that the arc shaped projections 30 are in contact with upper surfaces of the damper portions 25 and each of the engaging projections 29 is inserted and fitted into the gap between the adjacent damper portions 25. Lower side of the shaft receiving portion 28 is positioned inside the recess 18a of the bearing portion 18.

As shown in FIG. 1, the output shaft 16 has a shaft 31. The shaft 31 is provided at an upper end thereof with a shaft inserting portion 32 whose cross section is roughly cross-shaped and which is fitted into the shaft receiving portion 28 of the output plate 15, as shown in FIG. 4. The shaft inserting portion 32 has engagement surfaces 32a which are formed so as to come in contact with substantially entire surfaces of the shaft receiving hole 28 and through which the rotational driving force is transmitted to the output shaft 16. The shaft 31 of the output shaft 16 is, further provided at a lower side thereof with a gear 33 that is in mesh with a gear (not shown) of a window regulator of the power window apparatus.

As shown in FIG. 2, the shaft 31 is rotatably held in the shaft hole 18b of the bearing portion 18 and the shaft inserting portion 32 is inserted from a lower side of the output plate 15 into and fitted to the shaft receiving hole 28a so that four of the engagement surfaces 32a of the shaft inserting portion 32 are all in contact with four of the engagement surfaces 28b of the shaft receiving hole 28a. Axial movement of the output shaft 16 is restricted by fitting a clip ring 34 into a ring groove 32b formed at an axial upper end of the shaft inserting portion 32 which protrudes upward out of an axial end of the shaft receiving portion 28 so that the output shaft never slips out of the shaft receiving portion 28 and the shaft hole 18b. The shaft 31 is facilitated with an O-ring 35 for sealing a clearance between the shaft 31 and the shaft hole 18b.

Instead of the shaft inserting portion 32 and the shaft receiving hole 28a both of which are cross-shaped in cross section, the shaft inserting portion 32 and the shaft receiving hole 28a may have any other shape in cross section and, for example, may have three engaging surfaces 32b and 28b extending radially for engaging with each other.

The cover 17, which covers an upper opening of the wheel accommodating portion 12c, is fixed to the gear housing 12.

An operation of the motor device is described below.

When a side window glass is driven upward and, then, comes in contact with a window frame so that the upward movement of the side window glass is restricted, a rotation of the output shaft 16 via the window regulator is restricted. At this moment, reaction force acting circumferentially against the engagement surfaces 28b of the shaft receiving hole 28a from the engagement surfaces 32b of the shaft inserting portion 32 becomes rapidly large since the motor 10 is still driven to rotate. However, as axial length of the shaft receiving hole 28a, with which the shaft inserting portion 32 is engaged, is longer than thickness of the metal sheet which is stamped out to form the output plate 15, the reaction force from the engagement surface 32a is applied to axially extending wide areas of the engagement surfaces 28a so that stresses are not concentrated to a limited area thereof. Accordingly, the shaft receiving portion 28 scarcely deforms so that the fitting of the output shaft 16 to the shaft receiving portions 28 is unlikely to loose during an actual use, even if the output plate 15 is formed by press stamping a metal sheet whose sheet thickness and material strength are similar to the conventional metal sheet.

Further, the shaft receiving portion 28 is formed by press drawing and stamping in shape of the composite pipe which are folded back to constitute the downwardly extending outside wall and the upwardly extending inside wall. The upper end of the inside wall exceeds and protrudes upward by a certain length, which is not so long, out of the upper flat surface of the output plate 15. Therefore, while structural strength of the shaft receiving portion 28 is sufficiently reinforced, axial length of the wheel accommodating portion 12c is effectively limited.

In addition, since the folding down end of the inside or outside wall is located on a side of the damper portion 25 with respect to the output plate 15, the output shaft 16 is inserted into the inside wall from a side of the folding down end thereof when the output shaft 16 is assembled to the shaft receiving portion 28. The output shaft 16 is more easily inserted from the side of the folding down end of the inside wall than from the opposite side thereto, since the folding down end of the inside wall has round corners.

Furthermore, the engaging projections 29, which protrude downward and extend radially from the outer circumference of the output plate 15 toward the center axis thereof for circumferentially engaging with the damper portions 25, are provided by forming the grooves on the upper surface of the output plate 15 through the press drawing process. Since the notches or holes, which are opened downward and adjacent to the engaging projections 29, are not formed, the damper portions 25 never warp toward the output plate 15 so as to partly enter into the notches or holes, when the rotational driving reaction force is applied from the engaging projections 29 to the damper portions 25, as shown in the conventional output plate 53.

According to the embodiment of the present invention, the damper portions 25 are elastically deformed only in a circumferential direction with respect to the center axis thereof so that the damper portions 25 may absorb more surely the reaction force that is remarkably large. Accordingly, when the rotation of the output shaft is restricted, excessive force is hardly transmitted to the gears 20 of the worm wheel 13 so that the gears 20 are unlikely to be damaged.

Moreover, since the bearing portion 18 is provided on the upper end thereof with the recess 18a into which the lower side of the shaft receiving portion 28 is inserted, the worm wheel 13 and the output plate 15 are partly overlapped in an axial direction at a position on an upper side of the output shaft 16. Accordingly, while the axial length of the wheel accommodating portion 13c becomes shorter, the axial length of the bearing portion 18 for holding the worm wheel 13 becomes longer so that more stable rotation of the worm wheel 13 may be secured.

According to the embodiment mentioned above, though the axial upper end of the shaft receiving portion 28 and the engaging projections 29 are positioned on opposite sides of the output plate 15, the axial upper end of the shaft receiving portion 28 and the engaging projections 29 may be positioned on a same side of the output plate 15.

Further, instead of the shaft receiving portion 28 shaped as the composite pipe having the inside and outside walls, the shaft receiving portion 28 may be formed by press drawing in shape of a single pipe protruding only upward or downward out of the flat surface of the output plate 15. In this case, the output plate 15 may be also provided with the shaft receiving hole 28a whose axial length is much longer than thickness of the metal sheet for the output plate 15, the engagement of the output shaft 16 with the output plate 15 is unlikely to loose during an actual use.

Furthermore, instead of the outside wall extending downward and the inside wall extending upward, the outside and inside walls, which are folded down each other, may be formed to extend upward and downward, respectively.

Moreover, instead of the engaging projections 29 provided by forming grooves opened at the most outer circumstance of the output plate 1 and extending radially from the most outer circumstance toward the center axis thereof, the engaging projections 29 may be provided by forming grooves extending radially from positions adjacent the most outer circumference of the output plate 15 toward the center axis thereof and not opened at the most outer circumference thereof.

The motor device is applied not only to the vehicle power window apparatus but also any other system or apparatus such as a vehicle power door opening and closing apparatus and a vehicle power roof opening and closing apparatus.

What is claimed is:

1. A motor device comprising:

a motor;

a gear housing, which is fixed to the motor, being provided in a center thereof with a bearing, a wheel, which is housed in the gear housing and driven to rotate around the bearing by the motor, being provided on a surface thereof perpendicular to a center axis of the bearing with a recess;

a damper housed in the recess to rotate together with the wheel;

an output plate having a flat surface, which is engaged with the damper to rotate via the damper together with the wheel, being integrally provided in a center thereof with a linking portion axially extending by a length longer than thickness of the flat surface, the linking portion being formed in shape of a composite pipe having inside and outside walls which are folded down, the outside wall extending to protrude out of the flat surface in one direction and the inside wall, which is formed in cylindrical shape, extending through an inside of the outside wall perpendicularly to the flat surface in a direction opposite to that of the outside wall, wherein the inside wall has a shaft receiving hole with a plurality of engagement surfaces extending axially for receiving circumferential force; and an output shaft, which is rotatably held in the bearing, being provided at an axial end thereof with a shaft inserting portion fitted to the shaft receiving hole, wherein the output shaft penetrates the wheel and the damper and is connected to the output plate so as to rotate together therewith in a state that an axial length of the shaft inserting portion in contact with each of the engagement surfaces is longer than the thickness of the flat surface.

2. A motor device according to claim 1, wherein a number of the plurality of engagement surfaces is not less than three.

3. A motor device according to claim 1, wherein the outside wall extends from the flat surface toward the damper.

4. A motor device according to claim 3, wherein the inside wall extends up to a position exceeding a surface of the flat surface on an opposite side to the damper so that both axial ends of the inside wall are positioned on opposite sides of the flat surface.

5. A motor device according to claim 1, wherein the output plate is integrally provided with engaging projections protruding out of the flat surface on a side of the damper to form grooves thereon on an opposite side to the damper, each of which extends radially from an outer periphery thereof toward a center axis thereof at given angular intervals, the engaging projections being circumferentially engaged with the damper.

6. A motor device according to claim 1, wherein directions in which the engaging projections and the outside wall protrude out of the output plate are same.

7. A motor device according to claim 3, wherein the bearing is provided at an axial end thereof with a recess in which the linking portion is partly accommodated.

8. A transmission mechanism for transmitting rotational driving force comprising:

a driven member rotating upon receiving the rotational driving force;

an output plate having a flat surface, which is engaged with the driven member to rotate together therewith, being integrally provided in a center thereof with a linking portion axially extending by a length longer than thickness of the flat surface, the linking portion being formed in shape of a composite pipe having inside and outside walls which are folded down, the outside wall extending to protrude out of the flat surface in one direction and the inside wall, which is formed in cylindrical shape, extending through an inside of the outside wall perpendicularly to the flat surface in a direction opposite to that of the outside wall, wherein the inside wall has a shaft receiving hole with a plurality of engaging surfaces extending axially for receiving circumferentially the rotational driving force; and an output shaft being provided at an axial end thereof with a shaft inserting portion fitted to the shaft receiving hole, wherein the output shaft is connected to the output plate so as to rotate together therewith in a state that an axial length of the shaft inserting portion in contact with each of the engaging surfaces is longer than the thickness of the flat surface.

9. A transmission mechanism according to claim 8, wherein a number of the plurality of engagement surfaces is not less than three.

10. A transmission mechanism according to claim 8, wherein the outside wall extend from the flat surface toward the driven member.

11. A transmission mechanism according to claim 8, wherein the shaft inserting portion is inserted into the shaft receiving hole so as to be fitted thereto from the folding down end of the outside wall.

12. A transmission mechanism according to claim 10, wherein the inside wall extends up to a position exceeding a surface of the flat surface on an opposite side to the driven member so that both axial ends of the inner wall are positioned on opposite sides of the flat surface.

13. A transmission mechanism according to claim 12, wherein the output shaft is connected through an inside of the driven member to the output plate.

* * * * *